US009128936B1

(12) United States Patent  (10) Patent No.: US 9,128,936 B1
Campbell et al.  (45) Date of Patent: Sep. 8, 2015

(54) LIFE OF ACHIEVEMENT

(71) Applicants: Ed Campbell, Seattle, WA (US); Steve Maynock, Seattle, WA (US)

(72) Inventors: Ed Campbell, Seattle, WA (US); Steve Maynock, Seattle, WA (US)

( * ) Notice: Subject to any disclaimer, the term of this patent is extended or adjusted under 35 U.S.C. 154(b) by 0 days.

(21) Appl. No.: 14/120,770

(22) Filed: Jun. 24, 2014

(51) Int. Cl.
*G06K 5/00* (2006.01)
*G06F 17/30* (2006.01)

(52) U.S. Cl.
CPC ................................ *G06F 17/30011* (2013.01)

(58) Field of Classification Search
CPC ... G06F 17/00; G06F 17/30277; G06K 19/00; G06K 9/22; G06K 7/10
USPC ........... 235/375, 487, 462.01, 462.45, 472.01
See application file for complete search history.

(56) References Cited

U.S. PATENT DOCUMENTS

| | | | |
|---|---|---|---|
| 5,691,527 A | 11/1997 | Hara et al. | |
| 6,582,328 B2 | 6/2003 | Kuta et al. | |
| 7,657,835 B2 | 2/2010 | Mindrum et al. | |
| 8,234,251 B2 * | 7/2012 | Mindrum | 707/661 |
| 8,437,161 B1 * | 5/2013 | Dunavan | 365/51 |
| 2003/0155413 A1 * | 8/2003 | Kovesdi et al. | 235/375 |
| 2006/0029199 A1 * | 2/2006 | Osterer et al. | 379/88.22 |
| 2006/0155783 A1 * | 7/2006 | DeWitt et al. | 707/203 |
| 2009/0056090 A1 * | 3/2009 | Bunk et al. | 27/1 |
| 2011/0047893 A1 * | 3/2011 | Iezza | 52/103 |
| 2011/0161254 A1 * | 6/2011 | Van Den Bogart | 705/500 |
| 2012/0267427 A1 * | 10/2012 | Ahee et al. | 235/375 |
| 2013/0117977 A1 * | 5/2013 | Kennedy | 27/1 |
| 2013/0151554 A1 * | 6/2013 | Neal et al. | 707/769 |
| 2013/0235218 A1 * | 9/2013 | Cathcart et al. | 348/207.1 |
| 2014/0239061 A1 * | 8/2014 | Smith et al. | 235/376 |
| 2014/0299662 A1 * | 10/2014 | Harrison | 235/380 |

FOREIGN PATENT DOCUMENTS

WO WO 01/29736 A2 4/2001

* cited by examiner

*Primary Examiner* — Edwyn Labaze
(74) *Attorney, Agent, or Firm* — Lowe Graham Jones PLLC

(57) ABSTRACT

A system and method for facilitating a visit to a cemetery, the system including a machine readable symbol encoded with a first set of information, a reading device to read and decode the symbol, a transmitting device to send a first query based on the first set of information to a data repository, a receiving device to receive a second set of information, and a display device to display a first biography of the decedent. The biography story is based on the first and second sets of information.

10 Claims, 5 Drawing Sheets

LIFE OF ACHIEVEMENT

TECHNICAL FIELD

This invention generally relates to wireless data access. In particular, this invention relates to a wireless data access during a cemetery visit.

BACKGROUND OF THE INVENTION

In addition to be the final resting place of loved ones, a cemetery is also a place to honor and memorialize their lives. In years gone by, families would often visit cemeteries having spectacular landscaping and monuments to picnic, pay respects to ancestors and generally respect the Sabbath. Today cemetery tours, both guided and self-guided are becoming popular particularly with cemeteries having the repose of celebrities or other famous individuals. Generally, a marker or memorial, such as a headstone, a slab, a commemorative plaque, religious symbol or monument is provided at the internment location, whether a burial plot, or a niche in a columbarium. While the marker typically has the name of the decedent, date of birth and date of death, rarely will it have anything else due the marker's limited surface area. Other than the information on the marker, there is not much to learn about the decedent's life, especially for someone unfamiliar with the decedent unless external references are consulted.

For a visitor to a family burial plot in which multiple generations are buried, information about deceased family members, their interment locations, and their relationships to each other, and to the visitor, may be unavailable, scarce, or very hard to find. The recent popularity of genealogy as a home study shows that information about one's great-great-grandmother, or great-uncle has significant commercial value.

Today, obituaries and memorials exist in both printed and electronic forms. Obituaries, because of their notice-like nature, tend to be brief in presenting biographies of decedents, but generally provide information about their funeral plans. Memorials allow for more in depth presentation of the lives of the decedents although these memorials are generally silent as to their funeral information. An online memorial may be created to include text, slideshow, a custom home page, a guestbook, etc. U.S. Pat. No. 7,657,835 to Mindrum, et al. discloses one such method for creating an on-line commemorative presentation for use at a funeral. Published Provisional Patent Application No. 60/160,392 by Platner discloses an online guest book and collaborative biography method for use in a funeral home setting. Thus, there is a recognition in the funeral industry that printed materials alone do not and cannot meet customer demands for dynamic presentations of a decedent's achievements.

Nevertheless, when researching a deceased loved one's information, the above prior art methods generally require searching. Even online or virtual obituaries and memorials such as those described above require a user (or a visitor to the website) to search for information by typing a name in a search field, or clicking on a name that is visibly listed on the website, etc. Looking for the location of a loved one's interment site generally involves further searches and/or investigation, through records or registries of cemeteries, obituaries, or the memories of family members. While printed cemetery guides may provide limited information regarding a few famous or even infamous decedents in a particular cemetery, such information is not interactive, dynamic or necessarily cross referenced to related individuals in the same cemetery. Thus, a need exists for an interactive, dynamic system to reduce the delay and complexity of learning about a deceased loved one in the context of a cemetery, making it a quicker, easier, fulfilling and more memorable experience.

SUMMARY OF THE INVENTION

It is therefore an object of the present invention to provide a system and method that enhances a visitor's experience when visiting an interment space of a loved one in a cemetery by reading a machine-readable symbol on a marker of the interment space with a portable device, querying a database and having a biography of the loved one presented on a display of the portable device.

It is a further object of the present invention to provide a system and method which achieves the above object and which also shows the location of a second interment space in the same cemetery of another decedent related to the loved one.

It is yet another object of the present invention to provide a system and method which achieves the above objects and also presents a biography of the decedent interred in the second interment space on the display of the portable device.

The invention achieves the above objects, and other objects and advantages which will become apparent from the description which follows, by providing a system and method for reading a machine readable symbol having a first set of information encoded therein, the machine readable symbol being physically associated with a first decedent associated with a first interment space (e.g., on a grave marker) in a cemetery. The system preferable includes a data repository storing a plurality of second sets of information associated with a plurality of decedents.

In preferred embodiments of the invention, the visitor is provided with a portable device having a reader adapted to decode the machine readable symbol into the first set of information, a transmitter adapted to send a first query to the data repository (typically remote from the cemetery) by way of a communication network. The first query is preferably based on the first set of information, and the device receiver is adapted to receive a second set of information from the data repository by way of the communication network. The device is further provided with a display adapted to present a first biography of the first decedent and an indication of a second decedent interred in a second interment space in the cemetery, wherein the first biography is based at least on the first and second sets of information, and the second decedent is associated with the first decedent. The indication of the second decedent may be in the form of a geographical map.

DETAILED DESCRIPTION OF THE PREFERRED EMBODIMENTS

Figure 1:
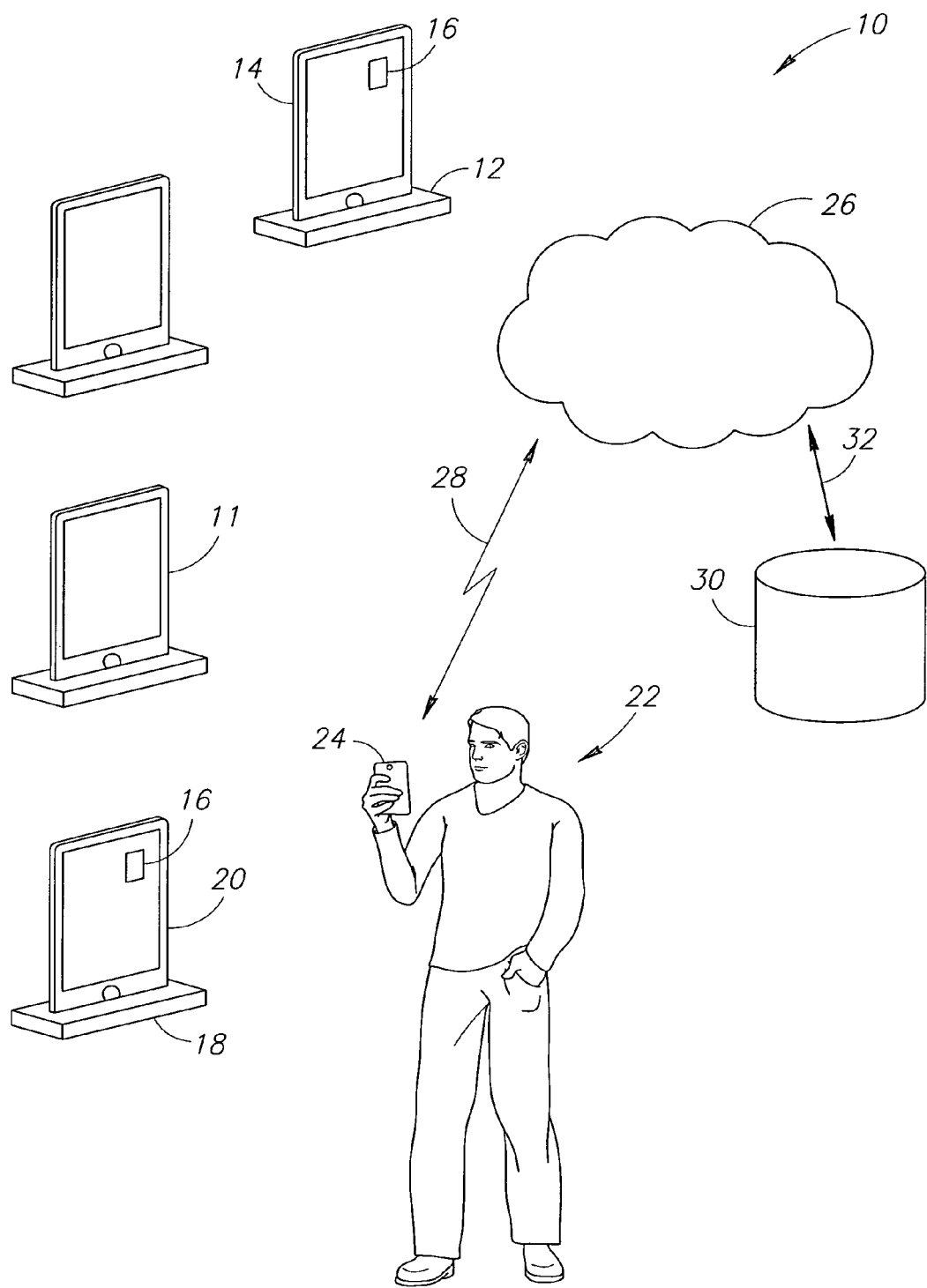
FIG. 1 is an environmental view of a system for on-demand presentation of decedent's biography according to one embodiment of the present invention.

A cemetery visit assistance system in accordance with the principles of the present invention is generally indicated at reference numeral 10 in the various Figures of the attached drawings wherein numbered elements in the Figures correspond to like numbers/elements herein. The system 10 is generally employed with respect to a cemetery or the like having a plurality of grave sites 11 with a first interment space 12 for such as a grave, cinerary urn recess in a columbarium or the like first decedent being marked with a first marker 14, such as a tombstone having a machine-readable symbol 16. The machine readable symbol may be optically readable as in a conventional Quick Response code or the like. It is preferred that the code be capable of coding more than just identification of the decedent, such as also being capable of encoding geographic locations or the like. Also as used herein "cemetery" includes any locus of remains of the deceased including but not limited to cemeteries, grave sites, memorial plots, columbaria, etc. as may be appropriate for various and sundry faith traditions. A second interment space 18 in the cemetery is marked with a second marker 20. In the cemetery environment, there is a visitor 22 equipped with a portable device 24 that is capable of reading the machine-readable symbol 16, and a communication network 26 that is communicatively coupled to the portable device 24 by way of a first communication channel 28 and to a data repository 30 by way of a second communication channel 32.

Figure 2A:
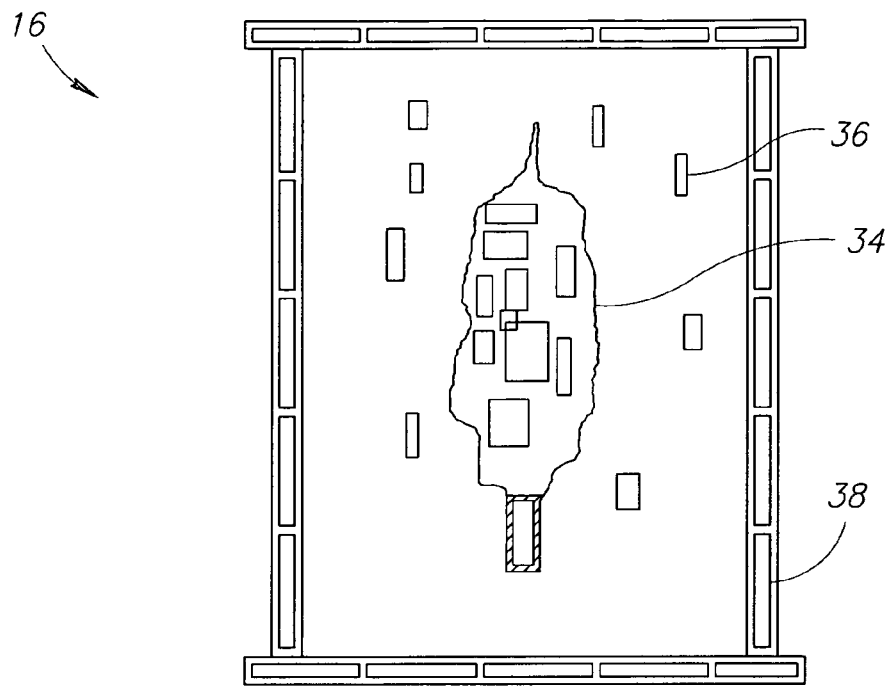
FIGS. 2A and 2B are front elevational views of a machine-readable symbol according to one embodiment of the present invention.

With further reference to FIG. 1, the visitor 22 uses the portable device 24 which incorporate a code reading apparatus to read the machine-readable symbol 16. A suitable device for reading the symbol 16 includes for example an iPhone® device manufactured by Apple, Inc., Cupertino, Calif., U.S.A. U.S. Pat. No. 5,691,527 to Hara, et al., the disclosure of which is incorporated herein by reference also discloses a suitable two dimensional code reading apparatus which may be integrated into the portable device 24. FIG. 2A shows one example of the machine-readable symbol 16 including a graphic background 34 and a plurality of geometric dots or geometric shapes 36 arranged in a pattern within a boundary 38. The geometric dots or shapes 36 are preferably arranged in a two dimensional matrix within which certain information has been encoded. In one embodiment, the geometric dots 26 represent binary codes. Encoding information in a symbol is well known in the art and for brevity is not described further in this specification. The symbols may outline an aesthetically pleasing shape, such as a candle or flame.

Figure 2B:
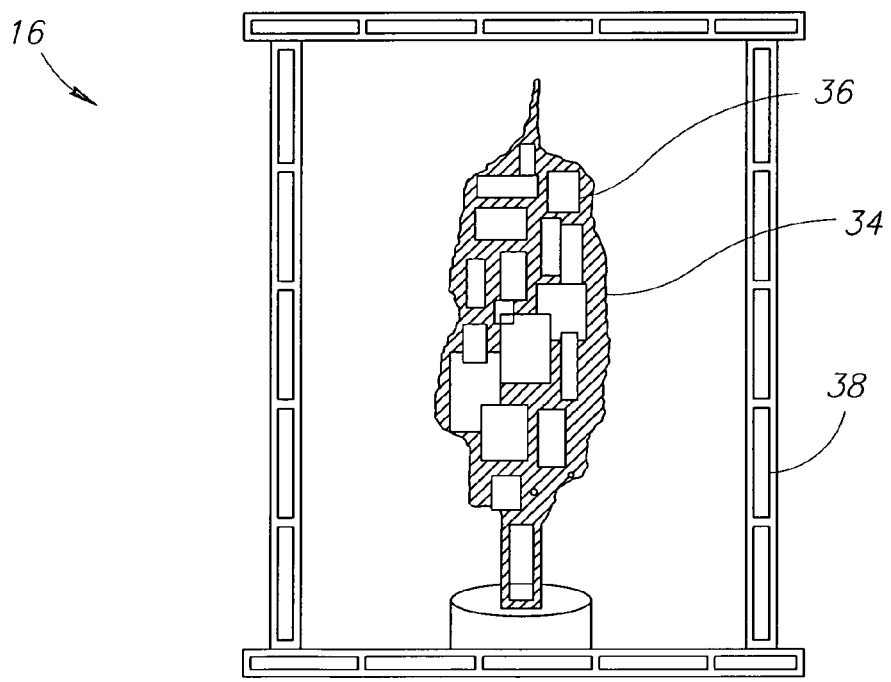

FIG. 2B shows another embodiment of the machine readable symbol 16 in which the geometric dots 36 are arranged in a pattern within the outline of the graphic background 34. For durability, the machine-readable symbol 16 may be engraved onto a marker using milling machines, lasers, and the like. In the preferred embodiment of the invention the machine-readable symbol 16 preferably is encoded with temporally permanent information about the decedent interred in the first interment space 12 such as name, date of birth and date of death. The amount of the encoded information may range between minimal to extensive, and may also depend on the number of geometric dots 26 in the symbol and/or the encoding methodology but does not include all possible information related to the decedent, especially time dependant information. In one example, only the decedents identity is coded into the symbol. In an alternate embodiment, additional information about the decedent may also be encoded with information such as its geographic coordinates, its location designation in the cemetery, and the like. In yet another example, a uniform resource locator, or URL for a remote database, may additionally be encoded in the machine-readable symbol.

Figure 3A:
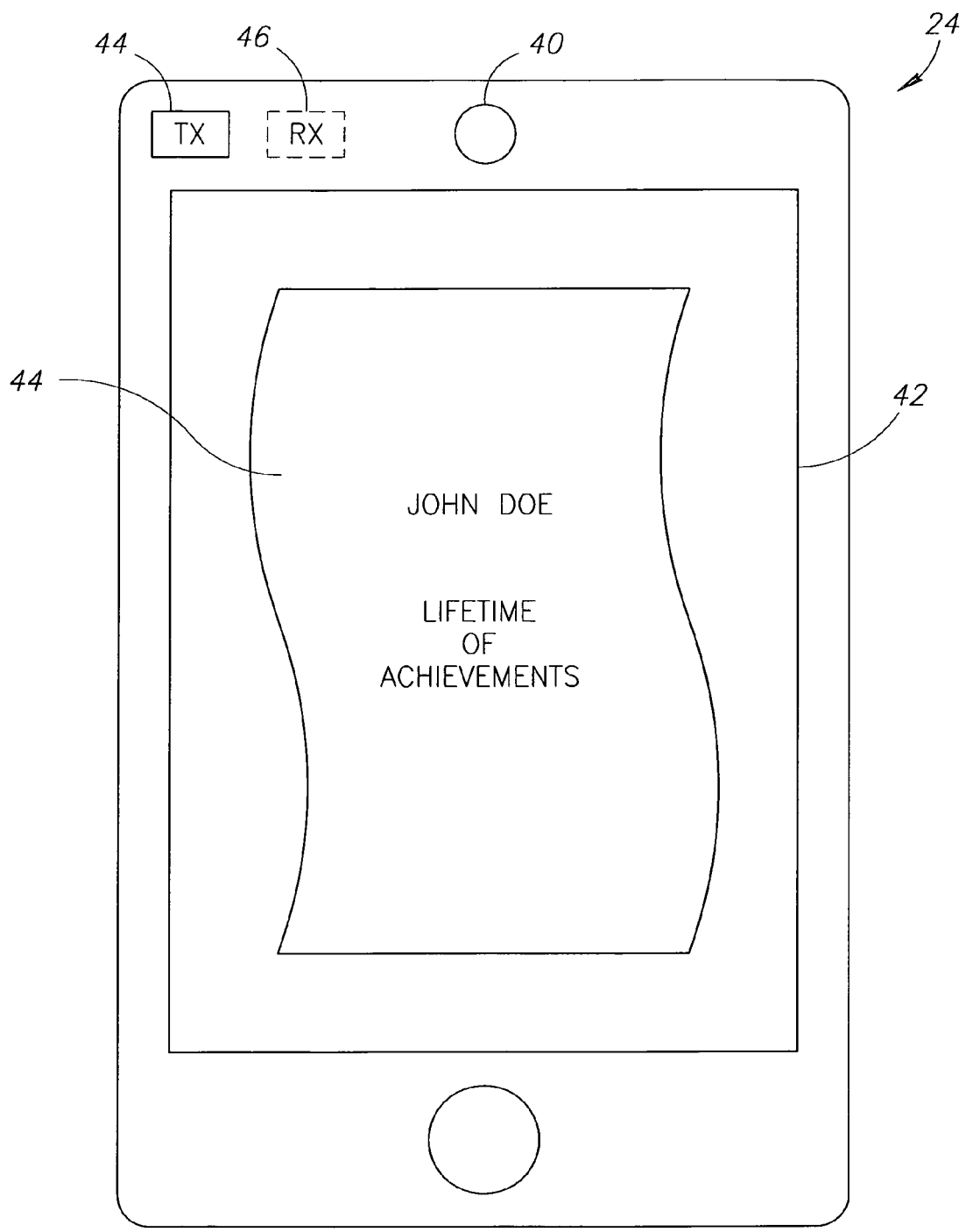
FIGS. 3A-B illustrate two examples of how a biography of a decedent may be presented on the display of a portable device according to various embodiments of the present invention.

FIG. 3A illustrates a front view of one embodiment of the portable device 24 that includes an optical reader 40 for reading the code 16 and a display 42. Although not shown in FIG. 3, the portable device 24 may also include a conventional Wi-Fi or cellular transmitter 44 and receiver 46. The portable device 24 is preferably a smart phone, or other smart communication device, capable of transmitting and receiving wireless communication. The reader 40 is further configured to read the machine-readable symbol 16 by scanning or capturing a snapshot of the machine-readable symbol 16 and decoding the information therein. In FIG. 3, the reader 40 includes a camera. In one non-limiting example, the reader 40 includes a decoder configured to decode the scanned or captured image of the machine-readable symbol 16 and retrieve some information about the decedent. The decoded information is preferably used to generate a query sent by the transmitter 44 to the data repository 30 to access additional information related to the decedent which may change over time (e.g., date of death and burial location of subsequent deceased relatives, etc.). Thus, the query may include a request for additional information about the decedent and/or information related to the decedent. Referring back to FIG. 1, the transmitter 44 in the portable device 24 sends the query over the first communication channel 28 to the communication network 26. The first communication channel 28 is preferably a wireless communication channel. The communication network 26 may be the interne or other network suitable to receive the query from the portable device 24 and to route or forward the query to the data repository 30.

The data repository 30 stores a plurality of files associated with a plurality of decedents. The files may be of text, videos, picture, metadata, or of other objects suitable to be presented on the display 42 of the portable device 24. Each decedent may be associated with one or more files, one of which preferably includes biographical data of the decedent. A metadata file may associate one decedent with one or more other related decedents such as members of the same family. Other association or relationships between decedents may also be indicated in metadata files.

In one non-limiting example, the data repository 30 is a server accessible as a node in the communication network 26, the server being accessible by way of the second communication channel 32. The second communication channel 32 is preferably a wired communication channel, although wireless communication channel is also contemplated. The plurality of files in the data repository 30 may be stored in non-volatile storage media such as magnetic, solid-state, optical, or a combination thereof. Other non-volatile storage media are also contemplated. The data repository 30 may include a controller to manage the plurality of files and to handle queries from the portable device 24. The query from the portable device 24 preferably includes an identification of a decedent whose information is requested by the portable device 24. A name, a unique number, or a unique code in the query may be used for identifying the decedent. In response to the query from the portable device 24, the controller in the data repository 30 searches the storage media and retrieves one or more files associated with the identified decedent. Preferably, the controller compiles a biographical package of the decedent based on the retrieved files, and transmits the compiled biographical package to the portable device 24 by way of the communication network 26.

In one non-limiting example, based on the retrieved one or more files associated with the identified decedent, the controller in the data repository 30 discovers that a later deceased relative of the identified decedent is also interred in the same cemetery, and that one or more files associated with this relative exist in the storage media of the data repository 30. The controller further includes an indication of the existence of the relative in the compiled biographical package for transmission to the portable device 24. Preferably, another biographical package associated with the relative is also transmitted to the portable device 24.

Figure 3B:
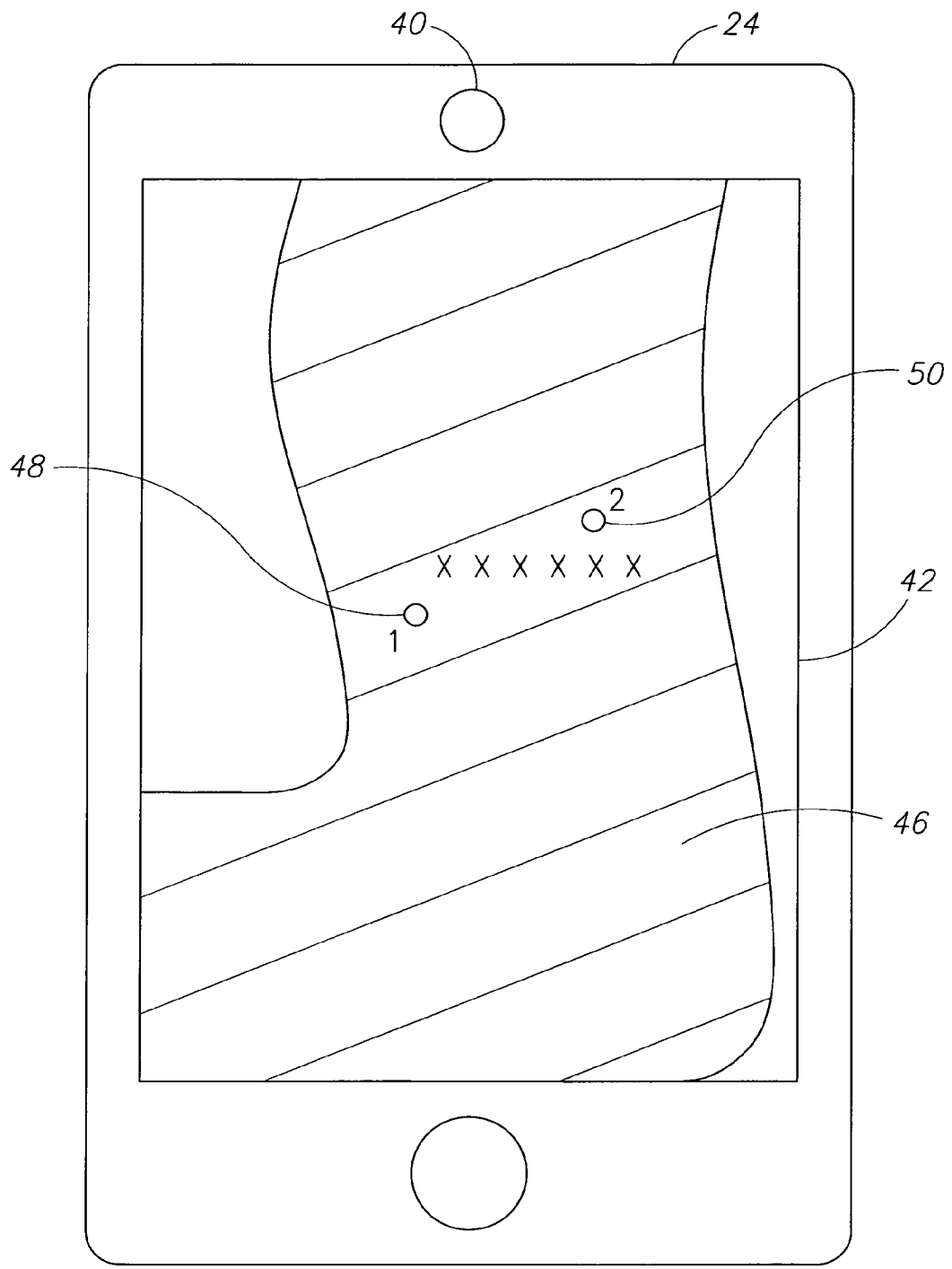

In another non-limiting example, the data repository 30 also stores visual representations or maps of cemeteries used to inter the plurality of decedents, and the one or more files of a decedent stored in the data repository 30 includes the location of the decedent's interment space within a cemetery. Preferably, the controller is able to determine locations of related decedents interred in a common cemetery. Upon receiving a biographical package from the data repository 30, the portable device 24 combines the information about the decedent decoded from the machine-readable symbol 16 with the received biographical package, and generates a combined biography 44 for presentation to the visitor 22. As illustrated in FIG. 3A, the display 42 is configured to present the biography 44. The display 42 may be any type of display suitable for integration in and/or mounting on, the portable device 24. A liquid crystal display screen, a light emitting diode screen, glass screen, and other display screens are contemplated for the display 42. The display 42 thus informs the visitor 22 of the existence, within the same cemetery, of an interment space of a relative of the decedent visited. Instead of immediately presenting the biography 44 of the decedent visited, the display 42 may first present a map of the cemetery 46 showing the locations of both interment spaces, as illustrated in FIG. 3B. The map of the cemetery 46 includes a first sign 48 indicating the location of the first interment space 12 in the cemetery and a second sign 50 indicating the location of the second interment space 14 in the cemetery. The visitor 22 is given an option to select the first sign 48 and view the biography 44 of the visited decedent, or to select the second sign 50 to view the biography 44 of the relative of the visited decedent. The map of the cemetery 48 with the first sign 48 and the second sign 50 may serve as a guide for the visitor 22 to find the second interment space 14. Each biography 44 preferably highlights the achievements of a decedent throughout his or her lifetime, and presented on the display 42 as a text. In one non-limiting example, the biography 44 may be accompanied or supplemented with photos, slideshow, videos, music, or a combination thereof, and may be presented on the display 42 as a multi-media presentation. In an alternate embodiment, the database may include information regarding related decedents whose remains are located in other cemeteries.

Figure 4:
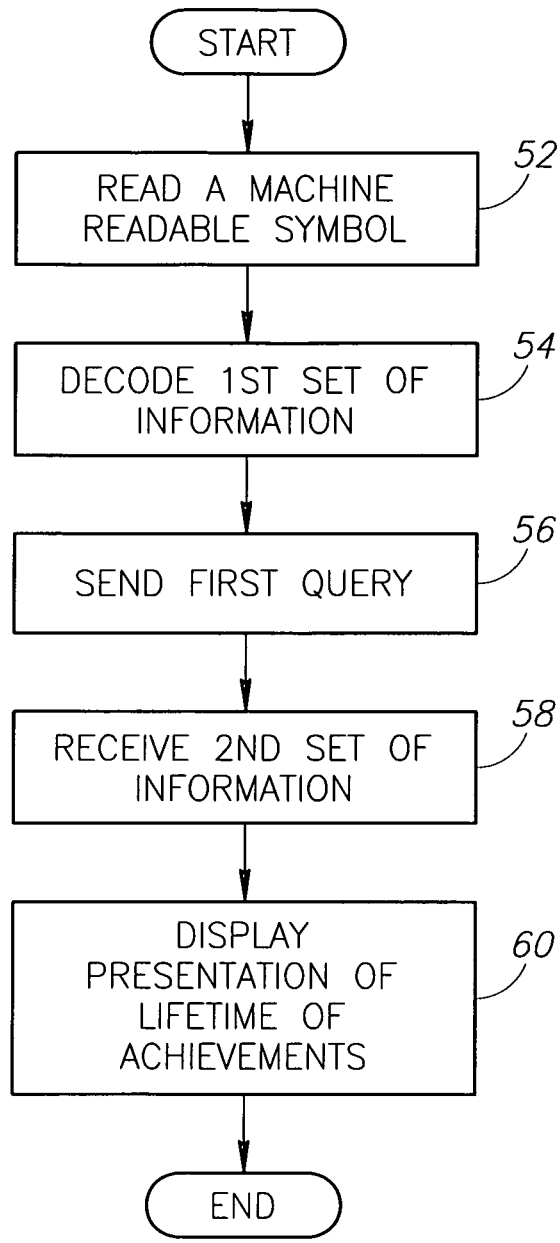
FIG. 4 is a diagrammatic process flow for presenting a biography of a decedent according to one embodiment of the invention.

FIG. 4 shows an example of a process flow for presenting the biography 44 on the display 42 of a portable device 24. A machine-readable symbol associated with a first interment space of a first decedent is read into a portable device (at 52) and the information associated with the first decedent encoded therein is decoded (at 54) as a first set of information. Based on first set of information, a query is sent to the data repository (at 56) by way of a communication network, and a second set of information associated with the first decedent is received by the portable device from the data repository (at 58). The first and second sets of information are combined to generate a presentation of the biography of the first decedent on a display of the portable device (at 60).

As will be apparent to those of ordinary skill in the relevant art, the above described system and method advantageously allocates time insensitive information for residence on the machine readable symbol, whereas time variable information is stored in the data repository 30. In this way, even if the data repository 30, communication network 26, or first or second communication channels 28, 32 are inoperative, at least the time insensitive information stored in the symbol 16 can be decoded and displayed by the portable device 22. Further yet, the time variable information may be readily updated as necessary at minimal expense.

Those of ordinary skill in the art will conceive of other alternate embodiments of the invention upon reviewing this disclosure. Thus, the invention is not to be limited to the above description, but is to be determined in scope by the claims which follow.

We claim:

1. A system to facilitate a cemetery visit, comprising:
   a machine readable symbol physically associated with a first decedent in a first interment space in a cemetery having a first set of information encoded therein;
   a data repository remote from the cemetery storing a plurality of second sets of information associated with a plurality of decedents in a corresponding plurality of interment spaces in the cemetery; and
   a portable device having a reader adapted to perceive and decode the machine readable symbol from the first set of information, a transmitter adapted to send a first query based on the first set of information to the data repository by way of a communication network, a receiver adapted to receive one of the second sets of information from the data repository by way of the communication network, and a display adapted to present a first biography of the first decedent and an indication of a second decedent interred in a second interment space in the cemetery, wherein the first biography is based at least in part on the first and second sets of information, and the second decedent is associated with the first decedent.

2. The system of claim 1 wherein the second set of information includes a visually perceptible downloadable map, second interment space and the second decedent wherein the display presents the map marked with the first and second interment spaces.

3. The system of claim 1 wherein the portable device includes a navigation device capable of receiving global positioning system signals to confirm location data encoded in the first set of information with the global positioning system signals.

4. The system of claim 1, wherein the machine readable symbol is in relief on a grave marker.

5. The system of claim 4, wherein the machine readable symbol is laser engraved.

6. A method for facilitating a cemetery visit, comprising:
   providing a machine readable symbol physically associated with a first interment space in a cemetery, wherein a first set of information is encoded therein;
   reading the machine readable symbol with a portable device having a display;
   decoding the symbol into the first set of information;
   providing a data repository storing a plurality of second sets of information associated with a plurality of decedents;
   sending to the data repository a first query based on the decoded first set of information;
   receiving from the data repository a second set of information; and
   presenting, on a display, a first biography of a first decedent interred in the first interment space, in human readable form, including providing an indication of a second decedent interred in a second interment space in the cemetery on the display of the portable device, the second decedent being associated with the first decedent wherein second set of information includes a visual representation of the cemetery, a location of the second interment space and the association between the first and second decedents, whereby a visitor to the cemetery can review the biographies of the first and second decedents.

7. The method of claim 6 wherein the map is presented on the display with markings for both the first and second interment spaces.

8. The method of claim 6 wherein the portable device captures a snapshot of the symbol.

9. The method of claim 6 wherein the association between the first and second decedents is genealogical.

10. The method of claim 6, wherein the first biography being based at least on the first and second set of information.

* * * * *